United States Patent [19]
Suzuki

[11] Patent Number: 5,315,191
[45] Date of Patent: May 24, 1994

[54] MINIATURE MOTOR

[75] Inventor: Satoshi Suzuki, Matsudo, Japan

[73] Assignee: Mabuchi Motor Co., Ltd., Chiba, Japan

[21] Appl. No.: 37,000

[22] Filed: Mar. 25, 1993

[30] Foreign Application Priority Data

Mar. 31, 1992 [JP] Japan ................... 4-075071

[51] Int. Cl.5 ............................................ H02K 21/26
[52] U.S. Cl. .................................. 310/40 MM; 310/154
[58] Field of Search ............... 310/40 MM, 44, 103, 310/89, 90, 154, 254, 258

[56] References Cited

U.S. PATENT DOCUMENTS

| | | | |
|---|---|---|---|
| 3,787,839 | 1/1974 | Fayling | 340/381 R |
| 3,939,371 | 2/1976 | Murakami | 310/254 |
| 4,112,320 | 9/1978 | Mohr | 310/154 |
| 4,237,397 | 12/1980 | Mohr et al. | 310/154 |
| 4,383,193 | 5/1983 | Tomite et al. | 310/154 |

Primary Examiner—Steven L. Stephan
Assistant Examiner—Matthew Nguyen
Attorney, Agent, or Firm—McGlew and Tuttle

[57] ABSTRACT

A miniature motor having a housing formed into a bottomed hollow cylindrical shape. The inner circumferential surface to which a pair of permanent magnets, which are rare-earth plastic magnets of an essentially C shape in cross section, are fixedly fitted. An end cap is fitted to an open end of the housing, and a rotor is rotatably supported in the housing by bearings provided on the housing and the end cap. A pair of the permanent magnets are formed in such a manner that the magnetic force of each magnet is made different from each other so that the rotor can be attracted to the permanent magnet having a larger magnetic force. One of the permanent magnets is made of a rare-earth plastic magnet containing a coloring material.

7 Claims, 2 Drawing Sheets

MINIATURE MOTOR

FIELD OF THE INVENTION

This invention relates to a miniature motor used in optical equipment, audio equipment, precision equipment, for example, and more particularly to a miniature motor configured so as to reduce mechanical noise and vibration, etc. by forming a pair of permanent magnets constituting a stator in such a manner that the magnetic forces thereof become different with each other, whereby imparting so-called magnetic side pressure to the rotor, in which improvement is made so that permanent magnets can be easily identified by visual inspection.

FIG. 1 is a longitudinal sectional front view illustrating the essential part of a miniature motor of a conventional type. In FIG. 1, numeral 1 refers to a housing, formed of mild steel, for example, into a bottomed hollow cylindrical shape. To the inner circumferential surface of the housing a pair of permanent magnets, 2 formed into an essentially C shape in cross section, are fixedly fitted. The housing 1 is constructed so that a rotor comprising an armature 3 facing the permanent magnets 2, and a commutator 4 can be incorporated. Numeral 6 refers to an end cap formed of a synthetic resin or other insulating material so as to engage with an open end of the housing 1. Numeral 7 refers to brush arms adapted in such a manner as to make sliding contact with the commutator 4 and are provided on the end cap 6, together with input terminals 8 electrically connected to the brush arms 7. Numerals 9 and 10 refer to bearings fixedly fitted to the bottom of the housing 1 and the central part of the end cap 6, respectively, so as to rotatably support a shaft 11 constituting the rotor 5.

With the aforementioned construction, as current is fed from the input terminals to the armature 3 via the brush arms 7 a force is imparted to the armature 3 present in a magnetic field formed by a pair of the permanent magnet 2 fixedly fitted to the inner circumferential surface of the housing 1, causing the rotor 5 to rotate, and driving external equipment (not shown) via the shaft 11.

In a miniature motor having the aforementioned construction, it is customary that a slight gap is provided between the shaft 11 and the bearings 9 and 10. If the shaft 11 wobbles in the bearings 9 and 10 during the rotation of the rotor 5, abnormal noise could occur. To prevent the mechanical noise or vibration caused by the wobbling of the shaft 11, a miniature motor of a so-called magnetic side-pressure design has been contrived in which a pair of permanent magnets having different magnetic forces with each other so as to attract the rotor 5 to any one permanent magnet 2. In such a miniature motor, some means is needed to visually identify the difference in magnetic properties of the permanent magnets 2.

The most common identifying means is to color any one of the permanent magnets 2 by spray or dip coating of a coloring material after molding. The use of a coloring material, however, requires an additional coloring process after molding, necessitating additional time and manhours, leading to increased cost. Furthermore, there is a possibility of the coloring material peeling off or discoloring in the subsequent processes, resulting in a loss of the identifying function of the coloring material. In addition, dimensional variability may occur due to the uneven coating thickness of the coloring material, deteriorating the mounting accuracy of the permanent magnets 2.

As another identifying means, an attempt has been made to provide an identifying part in the external appearance or shape of the permanent magnets 2. FIG. 2 is a perspective view illustrating the essential part of an identifying means of the permanent magnet 2. In FIG. 2, numeral 2a refers to a recess provided an end face of any one of the permanent magnets 2 to form an identification mark to discriminate one magnet having different magnetic properties from the other magnet. Although such an identification mark has advantages that it can be automatically formed in the molding process of permanent magnets 2 by machining part of the molding die for permanent magnets 2, and that it never disappears in the subsequent processes after molding, the recess 2a cannot be made too large. This poses a limitation in improving the visibility thereof as an identification mark. Furthermore, even a pair of the permanent magnets 2 of the same dimensions require two sets of molding dies, leading to increased cost. In a miniature motor, it is not practical to change the shape of any one of the permanent magnets 2 to a large extent because such a change may adversely affect the properties of the motor.

SUMMARY OF THE INVENTION

This invention is intended to solve the problems inherent in the aforementioned prior art. It is an object of this invention to provide a miniature motor in which a permanent magnet having different magnetic properties can be clearly identified visually from the stage of raw materials to the finished state.

DETAILED DESCRIPTION OF THE EMBODIMENTS

Figure 1:
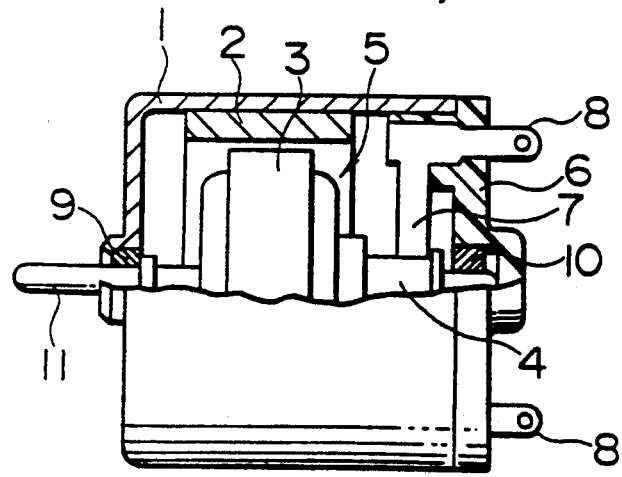
FIG. 1 is a cross-sectional front view illustrating the essential part of a miniature motor of a conventional type.
Figure 2:
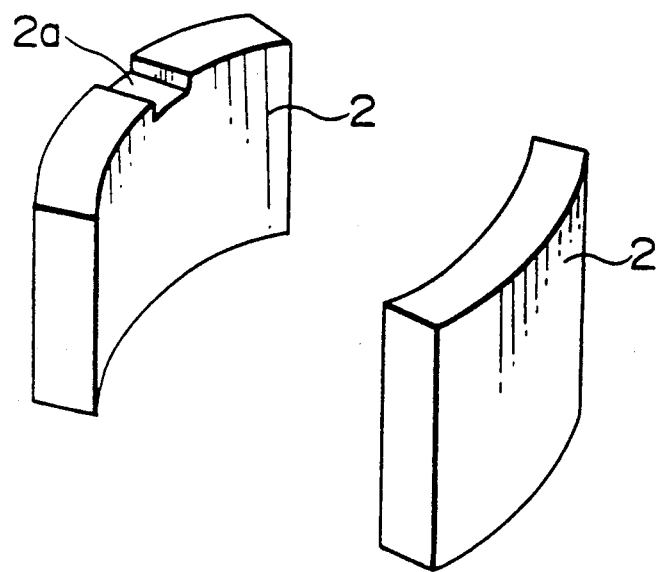
FIG. 2 is a perspective view illustrating the essential part of an example of permanent-magnet identifying means.
Figure 3:
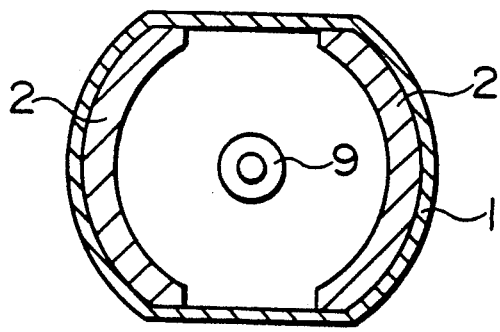
FIG. 3 is a cross-sectional view illustrating the essential part of a housing in an embodiment of this invention.

FIG. 3 is a cross-sectional view illustrating the essential part of a housing in an embodiment of this invention. Like parts are indicated by like numerals used in FIGS. 1 and 2. In FIG. 3, the permanent magnet 2 is made of a Nd-Fe-B plastic magnet, for example. That is, Nd-Fe-B fine powder is mixed and kneaded at high temperatures with a polyamide thermoplastic resin, such a nylon 12, nylon 6, nylon 66, etc., and extruded in an extruder into pellets. The pellets are charged into an injection-molding metal die to mold into a molding having a predetermined shape and size. The blend ratio of Nd-Fe-B fine powders and a thermoplastic resin as the binder is 7:3 by volume, and 9:1 by weight, for example, but may be selected appropriately in accordance with the properties required of the permanent magnets 2. The magnetic properties of a pair of permanent magnets can be made different from each other by making the grades of magnetic powder for each of the magnets different.

Next, any one of the permanent magnets 2 and 2 is injection molded using red-colored pellets prepared by adding 1–5 wt. % red oxide to the mixture. With a red-oxide content less than 1 wt. %, the visibility of moldings would be lowered because the Nd-Fe-B fine powder is inherently black in color, while with a red-oxide content exceeding 5 wt. %, the magnetic properties of the permanent magnets 2 would be deteriorated.

With the aforementioned construction, the permanent magnets 2 having different specifications, i.e., different magnetic properties can be easily and clearly identified by visual inspection by using pellets containing a coloring material, such as red oxide, to manufacture any one of the permanent magnets 2.

Although description has been made in this embodiment about an example where a Nd-Fe-B material is used for a rare-earth magnetic material, any other rare-earth magnetic materials may be used. As for the binder and coloring material, too, other known materials may be used.

This invention having the aforementioned construction and operation can achieve the following effects.

(1) The manufacture, including parts control, of miniature motors of a magnetic side-pressure specification using a pair of permanent magnets which are rare-earth plastic magnets having the same shape and dimension, and yet different magnetic properties can be carried out extremely easily and efficiently because permanent magnets having different magnetic properties can be easily and positively identified by visual inspection.

(2) The need for additional coloring processes to identify permanent magnets having different magnetic properties can be eliminated, and such magnets can be molded with the same molding dies. This leads to reduced manufacturing cost.

(3) Since permanent magnets can be applied to miniature motors in an as-molded state, the dimensional accuracy of permanent magnets can be improved, and motor parts, including permanent magnets, can be easily and accurately mounted inside the motor.

(4) Since permanent magnets having different magnetic properties can be identified by visual inspection throughout the entire manufacturing process ranging from the stage of raw materials for permanent magnets to molding, and even in the recycling process in which recycled materials are molded into permanent magnets, the entry of foreign matter, assembly errors and other unwanted accidents can be prevented. Thus, the quality and reliability of miniature motors can be improved substantially.

What is claimed is:

1. A miniature motor comprising:
   a housing formed into a bottomed cylindrical shape with an open end, and having an inner circumferential surface;
   an end cap positioned on said open end of said housing;
   a rotor rotatably supported by bearings positioned in said housing and said end cap;
   first and second permanent magnets positioned on substantially opposite sides of said inner circumferential surface of said housing, said first and second magnets having a substantially identical and interchangeable external shape and being C shaped in cross section, said first and second permanent magnets being formed from a colorable rare-earth magnetic plastic material, said first permanent magnet having a higher magnetic force than said second permanent magnet, said higher magnetic force of said first permanent magnet moving said rotor towards said first permanent magnet, said first permanent magnet also containing a coloring material integrated with said colorable rare-earth magnetic plastic material.

2. A motor in accordance with claim 1, wherein:
   a content of said coloring material is between 1 and 5 wt. %.

3. A motor in accordance with claim 1, wherein:
   said colorable rare-earth magnetic plastic material is Nd-Fe-B fine powder mixed and kneaded with a polyamide thermoplastic resin.

4. A motor in accordance with claim 3, wherein:
   said polyamide thermoplastic resin is one of nylon 12, nylon 6, and nylon 66.

5. A motor in accordance with claim 1, wherein:
   said coloring material is red oxide.

6. A motor in accordance with claim 1, wherein:
   said rotor is moved toward said first permanent magnet during operation of the motor.

7. A motor in accordance with claim 1, wherein:
   said rotor is radially spaced from said bearings.

* * * * *